United States Patent
Lenk

(10) Patent No.: US 8,590,287 B2
(45) Date of Patent: Nov. 26, 2013

(54) DEVICE FOR OPENING AND CLOSING A THRUST REVERSER DOOR OF A JET ENGINE

(75) Inventor: Olaf Lenk, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1118 days.

(21) Appl. No.: 12/554,132

(22) Filed: Sep. 4, 2009

(65) Prior Publication Data

US 2010/0058736 A1     Mar. 11, 2010

(30) Foreign Application Priority Data

Sep. 5, 2008  (DE) .................... 10 2008 045 851

(51) Int. Cl.
*F02K 1/54*     (2006.01)
(52) U.S. Cl.
USPC ............... 60/230; 244/110 B; 239/265.29
(58) Field of Classification Search
USPC ......... 60/226.2, 230; 244/110 B; 239/265.19, 239/265.25–265.31
See application file for complete search history.

(56) References Cited

U.S. PATENT DOCUMENTS

| | | | | |
|---|---|---|---|---|
| 4,422,605 | A | * | 12/1983 | Fage .................... 244/110 B |
| 5,224,342 | A | * | 7/1993 | Lair ................................ 60/230 |
| 5,257,840 | A | * | 11/1993 | Rouzaud ..................... 292/201 |
| 5,524,431 | A | * | 6/1996 | Brusson et al. ............... 60/226.2 |
| 5,720,449 | A | | 2/1998 | Laboure et al. |
| 5,775,639 | A | | 7/1998 | Fage |
| 6,021,636 | A | | 2/2000 | Johnson et al. |
| 6,042,053 | A | | 3/2000 | Sternberger et al. |
| 6,286,784 | B1 | | 9/2001 | Hardy et al. |
| 6,487,845 | B1 | | 12/2002 | Modglin et al. |
| 6,681,559 | B2 | | 1/2004 | Johnson |
| 6,684,623 | B2 | | 2/2004 | Langston et al. |
| 6,971,229 | B2 | | 12/2005 | Lair |
| 2002/0145078 | A1 | * | 10/2002 | Rouyer et al. ............ 244/110 B |
| 2007/0084191 | A1 | | 4/2007 | Beutin |
| 2010/0264676 | A1 | | 10/2010 | Sternberger et al. |

FOREIGN PATENT DOCUMENTS

| | | |
|---|---|---|
| EP | 0534833 | 3/1993 |
| EP | 0913570 | 5/1999 |
| GB | 2426283 | 11/2006 |

* cited by examiner

*Primary Examiner* — Ted Kim
(74) *Attorney, Agent, or Firm* — Timothy J. Klima; Shuttleworth & Ingersoll, PLC

(57) ABSTRACT

A device for opening and closing a thrust reverser door (3) of a jet engine includes at least one actuator and at least one locking mechanism (10) including at least one first locking element (11) arranged on the thrust reverser door (3) and at least one second locking element (13) arranged on the thrust reverser structure (5). To open the locking mechanism (10) against higher internal pressures in the thrust reverser (1) without increasing a power of the actuator or requiring the operation of the latter, the device includes, in addition to the actuator, at least one unloading mechanism (20) which is coupled to the locking mechanism (10).

20 Claims, 5 Drawing Sheets

DEVICE FOR OPENING AND CLOSING A THRUST REVERSER DOOR OF A JET ENGINE

Figure 1A:
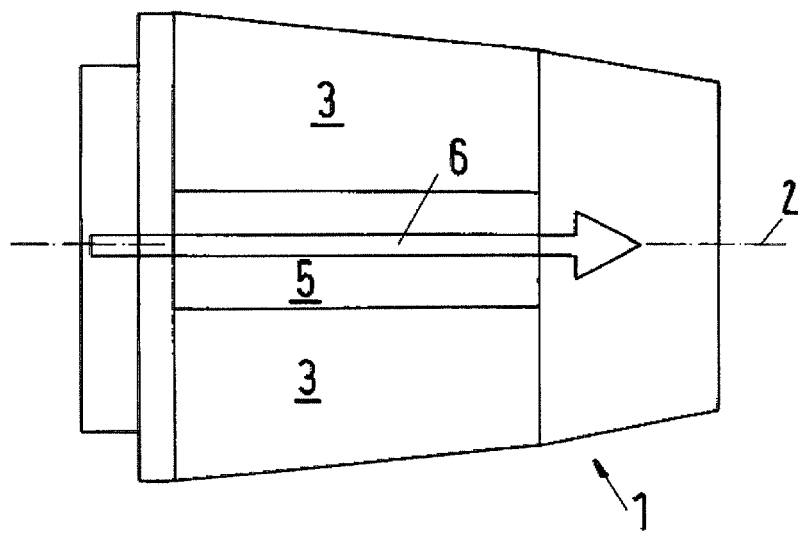

This application claims priority to German Patent Application DE 10 2008 045 851.1 filed Sep. 5, 2008, the entirety of which is incorporated by reference herein.

This invention relates to a device for opening and closing a thrust reverser door of a jet engine as well as to a method for opening and closing a thrust reverser door of a jet engine by use of a device.

Engines installed on the aircraft fuselage are frequently equipped with thrust reversers using deployable thrust reverser doors to deflect the exhaust gas jet such that braking is provided for the aircraft. The thrust reverser doors are mostly actuated by a hydraulic actuation system.

Thrust reversers installed together with the jet engine at the tail of the aircraft are mostly designed such that deploying the two thrust reverser doors produces reverse thrust. These thrust reverser doors block the exhaust gas flow in the rearward direction, while opening air exits at the top and bottom of the thrust reverser. These exits allow the exhaust gas flow to escape.

Since the thrust reverser doors must be closed in flight operation, they are for safety reasons secured by locking mechanisms. Each thrust reverser door has two locking mechanisms arranged opposite to each other on the circumferentially oriented sides of the thrust reverser door. For deploying the thrust reverser doors, each locking mechanism must firstly be unloaded and subsequently released. To achieve this, the thrust reverser doors must be moved against the internal pressure in the thrust reverser (overstow), requiring a corresponding force. In present-day thrust reversers, the force effect of the actuators of the hydraulic actuator system is reversed for this purpose.

U.S. Pat. No. 6,487,845 B1 discloses a jet engine with thrust reverser doors opened and closed by actuators. To open and close the locking mechanisms at the thrust reverser doors, the actuators pull the thrust reverser doors in the closing direction until the locking mechanisms are unloaded and can be released.

With demands increasing in various respects, in particular with regard to the response time of the thrust reverser, unloading of the locking mechanisms is to be accomplished at ever-higher internal pressures. The actuator forces required for this purpose necessitate correspondingly large and heavy actuators. Furthermore, the structure of the thrust reverser must be capable of handling the high actuator forces, resulting in a correspondingly strong and therefore heavy design.

In a broad aspect, the present invention provides for opening the locking mechanism also against higher internal pressures in the thrust reverser without increasing the power of the actuator or requiring the operation of the latter.

In a broad aspect the present invention provides a device for opening and closing a thrust reverser door of a jet engine, with the device having at least one actuator and at least one locking mechanism including at least one first locking element arranged on the thrust reverser door and at least one second locking element arranged on the thrust reverser structure, and with the jet engine having a longitudinal axis. Besides the actuator, the device includes at least one unloading mechanism which is coupled to the locking mechanism.

The unloading mechanism provides for an introduction of force at the locking mechanism by which the actuator is assisted or substituted. The coupling of the unloading mechanism to the locking mechanism provides for direct unloading of the lock when the thrust reverser doors are opened. This direct load path relieves the remainder of the engine structure (actuators and their connection to the structure), enabling it to be weight-favorably designed. Furthermore, provision is made for a reduction of the response time of the thrust reverser.

Preferably, the unloading mechanism includes at least one unloading element arranged at the first locking element and having at least one force arm associated with the unloading element.

The unloading element at the first locking element provides that the introduction of force takes place directly on the first locking element and not indirectly by pulling on the doors, as with the actuator. The force arm is used for the introduction of force into the unloading element and, thus, for moving the first locking element.

In particular, the force arm can be arranged essentially parallel to the longitudinal axis of the jet engine. This enables the force arm to be space-savingly accommodated on the engine structure, with the force arm also being located outside of the range of travel of the thrust reverser door.

Furthermore, the unloading element can have at least one inclined and/or curved surface facing the thrust reverser door and the force arm at least one roller being rollable on the inclined and/or curved surface of the unloading element.

In this arrangement, the force arm is enabled by the roller to roll with low friction on the inclined and/or curved surface when moving along the unloading element.

Preferably, the second locking element is attached to a swivel arm. This enables the locking mechanism to be released.

In a particular embodiment, the second locking elements of two adjacent thrust reverser doors are attached to a common swivel arm. This reduces the number of components on the locking mechanism.

In particular, the first locking element can be essentially L-shaped and, on the portion engaging the second locking element, provided with a securing element for the second locking element.

The L-shaped design of the first locking element enables the lock to be positively released. The securing element prevents the locking mechanism from being unintentionally released.

In a particular embodiment, the first locking element is a hook and the second locking element is an eye, or vice versa. Hook and eye are a simply designed locking mechanism which is safely releasable and securable.

It is a further object of the present invention to provide a method for opening and closing a thrust reverser door of a jet engine by use of a device, with the thrust reverser door being pulled in closing direction at the beginning of the opening process and with the associated locking mechanism being unloaded and released in the process. At least one force is introduced at the locking mechanism which, solely or jointly with the actuator, unloads the locking mechanism, with the locking mechanism being relieved from force load upon unloading and releasing.

The additional force assists the actuator in pulling the thrust reverser door against the internal pressure in the jet engine and, thus, in unloading the locking mechanism. Removing the load upon unloading and releasing the locking mechanism enables the thrust reverser doors to be subsequently opened. The additional force enables relatively light-weight actuators and structural connections to be used. In addition, the response time of the thrust reverser is reduced in that the thrust reverser doors open more quickly.

Preferably, force is introduced at the unloading element of the first locking element. Introduction of force directly at the locking mechanism provides for a short force transmission path and low losses.

In particular, the force acts essentially parallel to the longitudinal axis of the jet engine and moves the first locking element in closing direction of the thrust reverser door.

In a direction parallel to the longitudinal axis of the jet engine the force is positively producible by a corresponding mechanism on the engine structure. Moving the first locking element in the closing direction of the thrust reverser door enables the locking mechanism to be released, in particular if the latter includes a hook and an eye.

In a useful embodiment, the force is produced by a force arm which, via the roller, moves along the inclined and/or curved surface of the unloading element.

The force of the force arm is thereby transmitted to the unloading element, and thus to the first locking element, in a simple and low-loss manner.

Figure 1B:
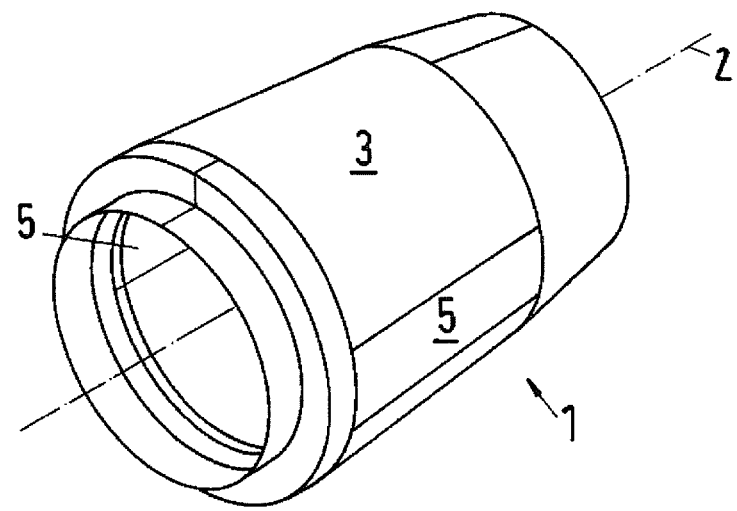
Figure 1C:
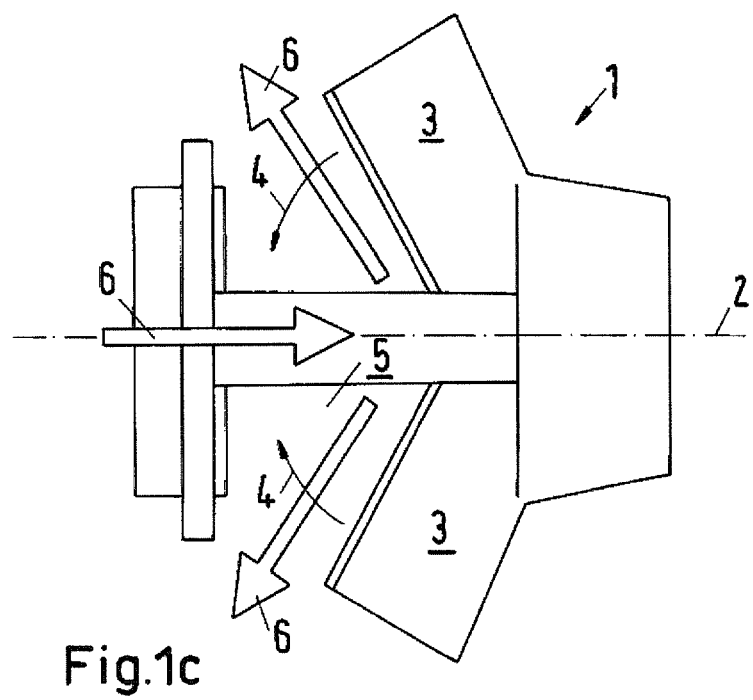
Figure 1D:
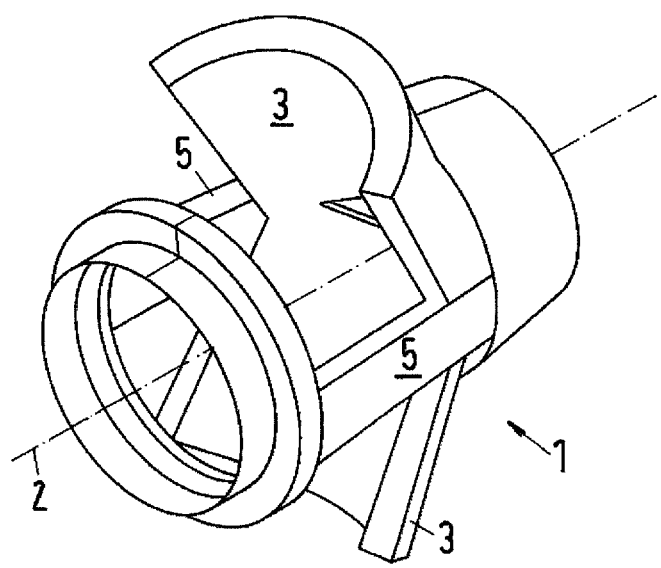
Figure 2A:
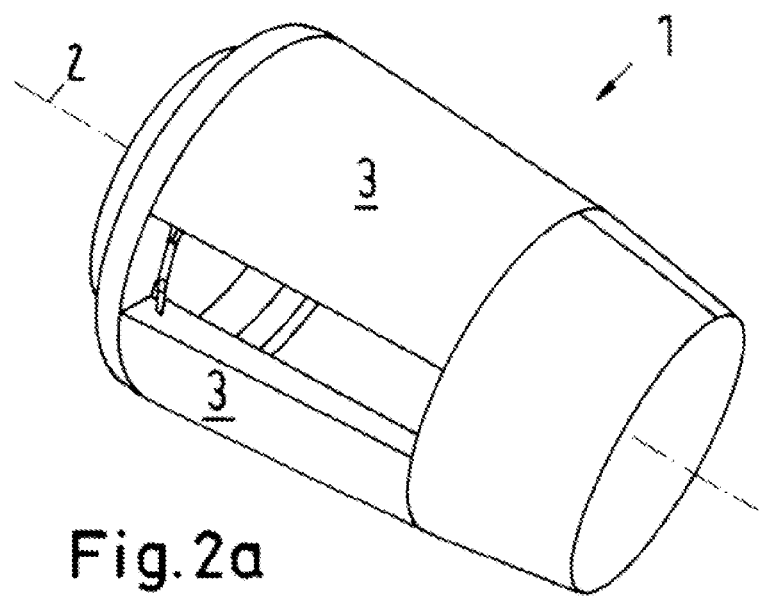
Figure 2B:
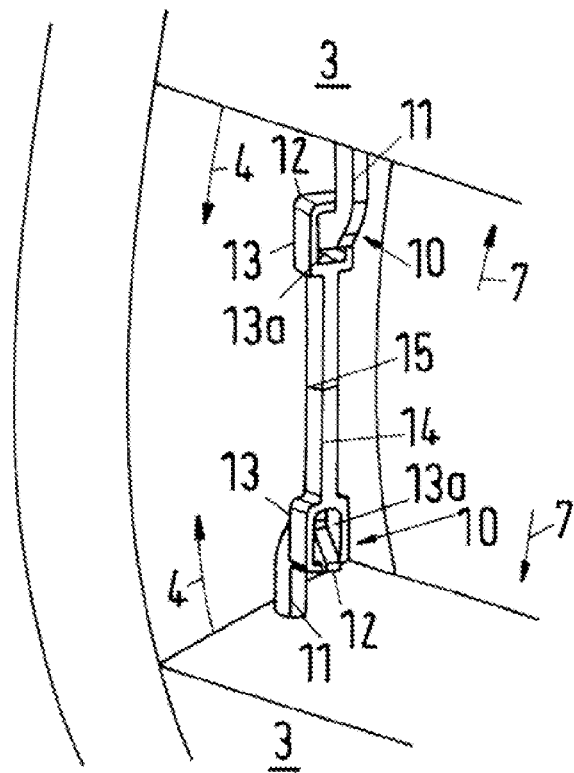

The present invention is more fully described in light of the figures showing the state of the art and a preferred embodiment:

FIG. 1a is a side view of a thrust reverser of a jet engine with closed thrust reverser doors, FIG. 1b is a perspective view of the thrust reverser with closed thrust reverser doors, FIG. 1c is a side view of the thrust reverser with opened thrust reverser doors, FIG. 1d is a perspective view of the thrust reverser with opened thrust reverser doors, FIG. 2a is a perspective view of the thrust reverser with closed thrust reverser doors having a locking mechanism in accordance with the state of the art, FIG. 2b is an enlarged perspective view of the locking mechanism in accordance with the state of the art, FIGS. 3a-d show a representation of the steps for opening the locking mechanism in accordance with the state of the art, and FIGS. 4a-d show a representation of the steps for opening the locking mechanism with unloading mechanism in accordance with the present invention.

FIGS. 1a-d show schematic views of a thrust reverser 1 of an otherwise not illustrated jet engine having a longitudinal axis 2. The thrust reverser 1 includes two thrust reverser doors 3 and one thrust reverser structure 5.

The thrust reverser doors 3 are arranged opposite to each other and symmetrically to the longitudinal axis 2 of the engine. The thrust reverser structure 5 is circumferentially arranged between the two thrust reverser doors 3 on opposite sides of the jet engine.

FIGS. 1a and 1b show the thrust reverser 1 with closed thrust reverser doors 3. The thrust reverser doors 3 must be closed in all operating states in which braking of the engine is prohibited, for example during take-off and in flight. Here, the exhaust gas flow 6 is essentially rectilinearly passed through the thrust reverser 1.

FIGS. 1c and 1d show the thrust reverser 1 with opened thrust reverser doors 3. The thrust reverser doors 3 are only opened when braking is to be provided for the aircraft. Then, the exhaust gas flow 6 rectilinearly entering the thrust reverser 1 is deflected along the opened thrust reverser doors 3 and discharged to the environment (reverse thrust).

The FIGS. 2a, 2b and 3a-d show two closed locking mechanisms 10 in accordance with the state of the art for two closed thrust reverser doors 3.

The two adjacent locking mechanisms 10 are arranged opposite to each other, but aligned in contrary direction. Each locking mechanism 10 includes a first locking element in the form of a hook 11 and a second locking element in the form of an eye 13. The two locking mechanisms 10 have a common swivel arm 14.

On both circumferentially oriented sides of each thrust reverser door 3 one locking mechanism 10 is arranged each. The hook 11 of the locking mechanism 10 is essentially L-shaped and has a securing element 12. An eye 13 with an opening 13a is arranged at each end of the swivel arm 14. The swivel arm 14 has a joint 15 which subdivides the swivel arm 14 into two symmetrical portions. The swivel arm 14 is located on the thrust reverser structure 5 (cf. 1a-d) via the joint 15.

The hook 11 engages the eye 13 when the thrust reverser door 3 is closed. Thereupon, the securing element 12 prevents the locking mechanism 10 from being unintentionally released. The opening direction 7 of the thrust reverser doors 3 faces away from the locking mechanisms 10 to the outside. The closing direction 4 is to the opposite side, i.e. towards the locking mechanisms 10.

In flight, the thrust reverser doors 3 must be closed to avoid unstable flight conditions. Accordingly, since this is relevant for the safety of the aircraft, provision is made for the locking mechanisms 10.

FIGS. 3a-d illustrate the three steps of unloading and releasing the locking mechanism 10 and of opening the thrust reverser doors 3 in accordance with the state of the art.

Figure 3A:
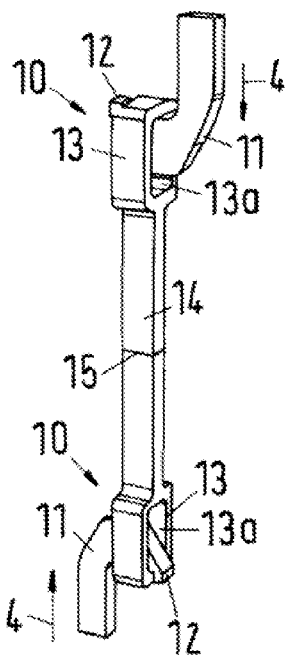
Figure 3B:
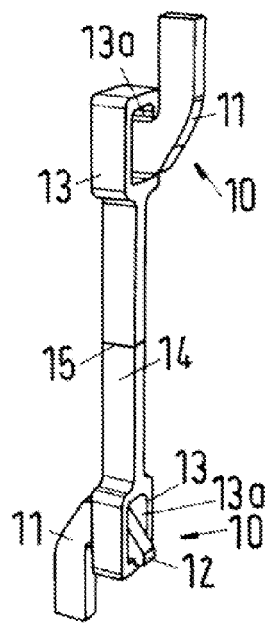

FIGS. 3a and 3b show the first of the three steps, namely the process of unloading two locking mechanisms 10 coupled via the swivel arm 14. Non-illustrated actuators pull the thrust reverser doors 3, and thus the hooks 11, in closing direction 4 (FIG. 3a). As soon as the securing elements 12 of the hooks 11 are within the openings 13a of the eyes 13, movement of the thrust reverser doors 3 is stopped (FIG. 3b).

Figure 3D:
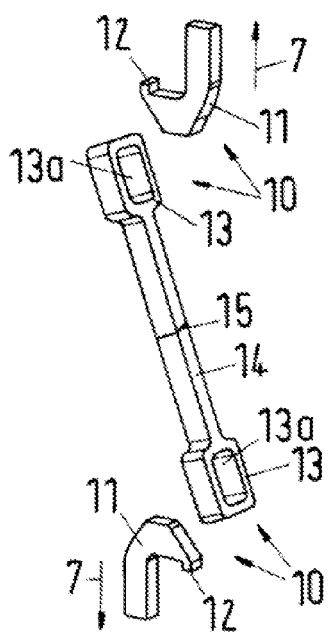
Figure 3C:
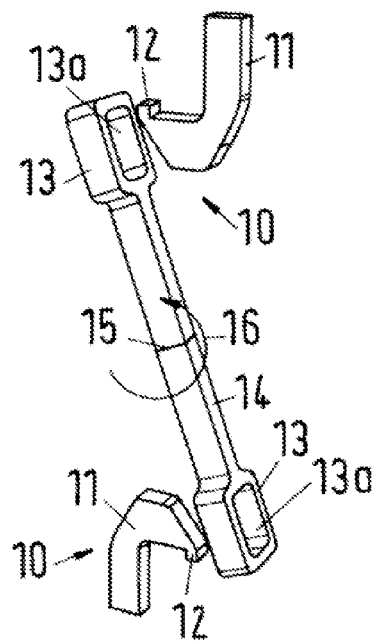

FIG. 3c shows the second step, namely the release of the two locking mechanisms 10. The swivel arm 14 is turned in swiveling direction 16 until the eyes 13 clear the hooks 11.

FIG. 3d shows the third step, namely the deployment of the thrust reverser doors 3. The actuators (non-illustrated) move the thrust reverser doors 3 in opening direction 7 until the required reverse thrust is produced. Reverse thrust is necessary for braking down the aircraft.

FIGS. 4a-d show the locking mechanisms 10 according to the present invention which, other than the locking mechanisms in FIGS. 2a, 2b and 3a-d, are each provided with an unloading mechanism 20.

Besides the unloading mechanism 20, the locking mechanisms 10 each include a hook 11 with a securing element 12, an eye 13 and a swivel arm 14 with a joint 15, with the swivel arm 14 connecting two adjacent locking mechanisms 10.

Except for the unloading mechanism 20 described hereinafter, the design and arrangement of the locking mechanisms 10 and the associated components correspond to those in FIGS. 2a, 2b and 3a-d.

Each unloading mechanism 20 includes an unloading element 21 and a force arm 23.

The unloading element 21 is part of the hook 11 and is arranged on the side of the hook 11 facing away from the eye 13. The unloading element 21 is wedge-shaped, with the inclined surface 22, which is essential for the operation of the unloading mechanism 20, facing towards the thrust reverser door 3 (cf. FIG. 2a) or in opening direction 7 of the thrust reverser door 3, respectively.

The force arm 23 is arranged parallel to the longitudinal axis 2 of the jet engine (cf. FIG. 2a) and directed towards the inclined surface 22 of the wedge-shaped unloading element 21. On its end facing the inclined surface 22 of the unloading element 21, the force arm 23 is provided with a rotatably borne roller 24.

FIGS. 4a-d furthermore illustrate the three steps of unloading and releasing the locking mechanism 10 and of opening the thrust reverser doors 3 in accordance with the present invention.

Figure 4A:
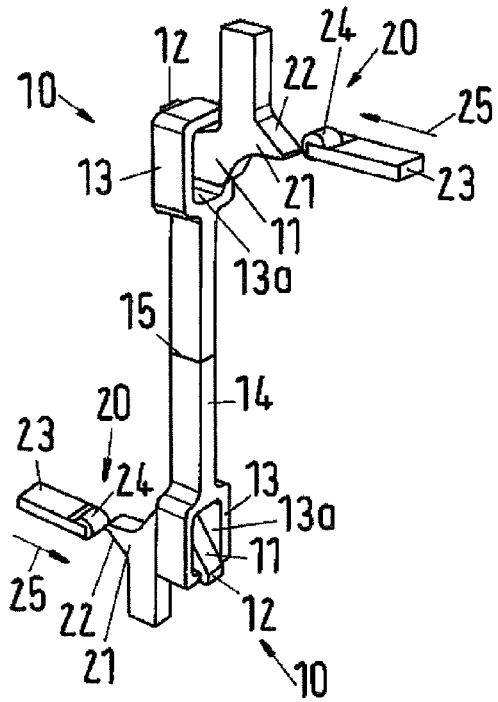

FIGS. 4a and b illustrate the first step in which two adjacent locking mechanisms 10 are unloaded. On each locking mechanism 10, the unloading mechanism 20 is actuated in that the force arm 23 is moved towards the inclined surface 23 of the wedge-shaped unloading element 21 by applying a force 25.

In the process, the roller 24 rolls along the inclined surface 22, while the hook 11 simultaneously moves in closing direction 4 of the thrust reverser door 3 (FIG. 4a).

Figure 4B:
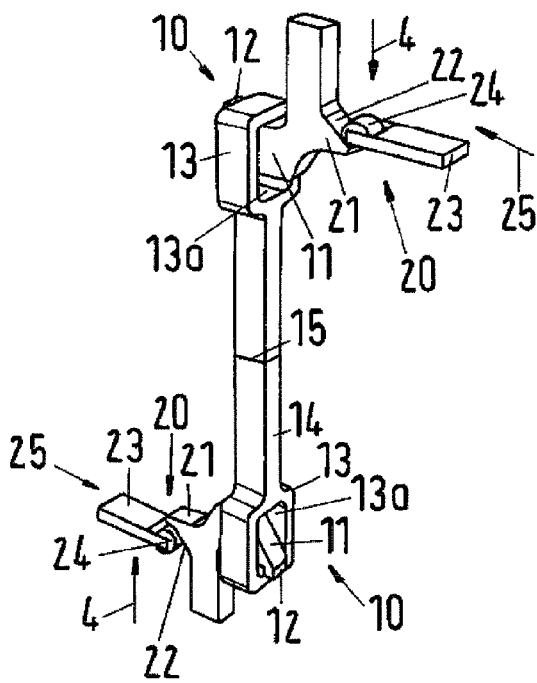

The force arm 23 is pressed against the inclined surface 22 until the securing element 12 of the hook 11 is raised to a height of the opening 13a of the eye 13 (FIG. 4b).

Figure 4C:
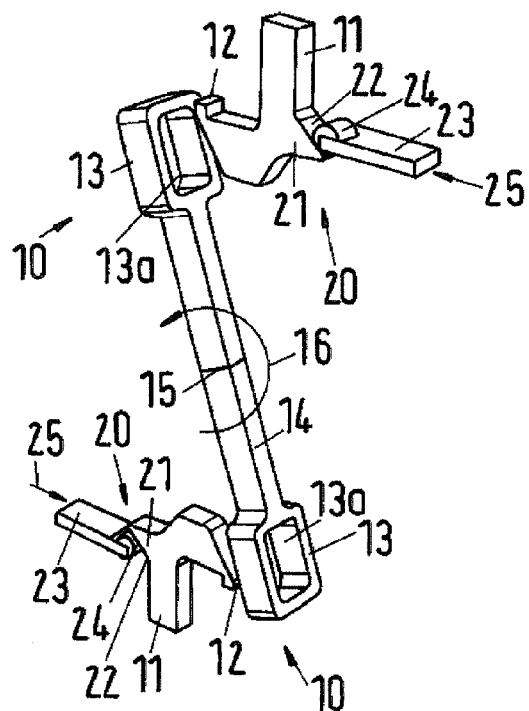

FIG. 4c illustrates the step of releasing the adjacent locking mechanisms 10. The swivel arm 14 is turned in swiveling direction 16 until the eyes 13 clear the hooks 11.

Figure 4D:
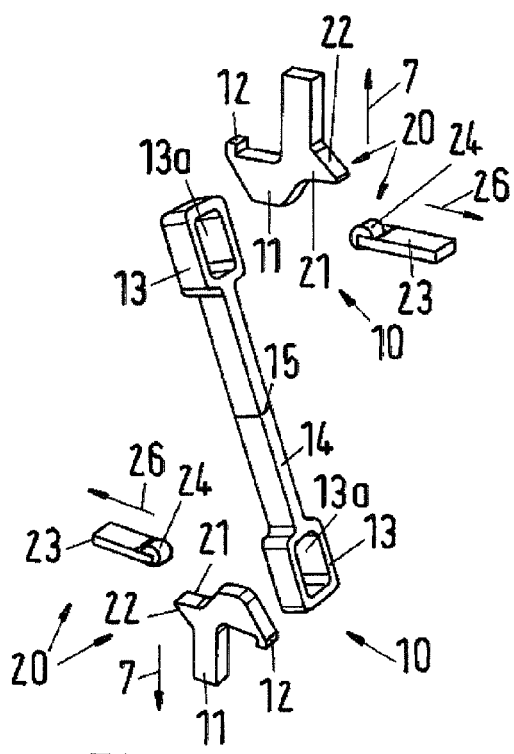

FIG. 4d shows the step of opening the thrust reverser doors 3. The force arms 23 are released from the forces 25 and retracted in releasing direction 26 until the force arms 23 clear the inclined surfaces 22 of the unloading elements 21. Subsequently, the actuators (non-illustrated) are activated which deploy the thrust reverser doors 3 in opening direction 7 until the required reverse thrust is produced. Reverse thrust is necessary for braking down the aircraft. The operation can be reversed for locking the thrust reverser doors closed.

The force 25 can be applied to the respective locking mechanism 10 independently or jointly with the actuators. The force arms 23 are controlled independently of the actuators. The force 25 may be generated mechanically, electromechanically, pneumatically or hydraulically.

LIST OF REFERENCE NUMERALS

1 Thrust reverser
2 Longitudinal axis
3 Thrust reverser door
4 Closing direction
5 Thrust reverser structure
6 Exhaust gas flow
7 Opening direction
10 Locking mechanism
11 Hook
12 Securing element
13 Eye
13a Opening
14 Swivel arm
15 Joint
16 Swiveling direction
20 Unloading mechanism
21 Unloading element
22 Inclined surface
23 Force arm
24 Roller
25 Force
26 Releasing direction

What is claimed is:

1. A method for opening and closing a thrust reverser door of a jet engine, comprising:
   providing at least one actuator for opening and closing the thrust reverser door;
   providing at least one locking mechanism for selectively locking the thrust reverser door in a closed position, the at least one locking mechanism including at least one first locking element arrranged on the thrust reverser door and at least one second locking element arranged on a thrust reverser structure; the at least one first locking element engageable with the at least one second locking element for selectively locking the thrust reverser door in a closed position;
   providing the at least one first locking element with an unloading element and a force providing element separate from any forces generated by the at least one actuator;
   pulling the thrust reverser door in a closing direction at a beginning of the opening process by applying a force from the force providing element against the unloading element of the first locking element to move the first locking element in a closing direction to unload the at least one first locking element from the at least one second locking element for disengagement of the at least one first locking element from the at least one second locking element;
   releasing the locking mechanism by disengaging the at least one first locking element from the at least one second locking element so that the thrust reverser door can be moved to an open position.

2. The method of claim 1, and further comprising attaching a swivel arm to the second locking element to swivel the second locking element between a locking position and an unlocking position.

3. The method of claim 2, and further comprising providing an additional second locking element of an adjacent thrust reverser door and attaching the two second locking elements to opposite ends, respectively, of the swivel arm.

4. The method of claim 3, and further comprising providing that the first locking element is essentially L-shaped and, on a portion engaging the second locking element, providing a securing element for the second locking element.

5. The method of claim 3, and further comprising providing that the first locking element is at least one chosen from a hook and an eye and the second locking element is the other of the hook and the eye.

6. The method of claim 1, and further comprising providing an additional second locking element of an adjacent thrust reverser door and attaching the two second locking elements to opposite ends, respectively, of the swivel arm.

7. The method of claim 1, and further comprising providing that the first locking element is essentially L-shaped and, on a portion engaging the second locking element, providing a securing element for the second locking element.

8. The method of claim 1, and further comprising providing that the first locking element is at least one chosen from a hook and an eye and the second locking element is the other of the hook and the eye.

9. The method of claim 1, wherein, the force is applied in a force direction essentially parallel to a longitudinal axis of the jet.

10. The method of claim 9, and further comprising providing the unloading element with at least one unloading surface facing in an opening direction of the thrust reverser door, the unloading surface comprising at least one chosen from an inclined surface and a curved surface; moving a force arm in the force direction different from the closing direction to engage a roller of the force arm against the unloading surface and convert the force in the force direction to a closing force in the closing direction against the unloading surface and force the unloading element in the closing direction.

11. The method of claim 10, wherein the force direction is normal to the closing direction.

12. The method of claim 11, and further comprising applying the force without operating the actuator for opening and closing the thrust reverser door.

13. The method of claim 12, wherein the unloading surface of the unloading element is separate from a surface of the first locking element that engages the second locking element.

14. The method of claim 13, wherein the unloading surface forms an inclined plane simple machine in operation with the roller.

15. The method of claim 1, and further comprising providing the unloading element with at least one unloading surface facing in an opening direction of the thrust reverser door, the unloading surface comprising at least one chosen from an inclined surface and a curved surface; moving a force arm in a force direction different from the closing direction to engage a roller of the force arm against the unloading surface and convert the force in the force direction to a closing force in the closing direction against the unloading surface and force the unloading element in the closing direction.

16. The method of claim 15 wherein the unloading surface of the unloading element is separate from a surface of the first locking element that engages the second locking element.

17. The method of claim 16, wherein the force direction is normal to the closing direction.

18. The method of claim 17, and further comprising applying the force without operating the actuator for opening and closing the thrust reverser door.

19. The method of claim 18, wherein the unloading surface forms an inclined plane simple machine in operation with the roller.

20. The method of claim 1, and further comprising applying the force without operating the actuator for opening and closing the thrust reverser door.

* * * * *